(12) United States Patent
O' Ryan

(10) Patent No.: US 10,591,652 B2
(45) Date of Patent: Mar. 17, 2020

(54) MULTI-LAYER COATED GLASS SUBSTRATE

(71) Applicant: Schott Gemtron Corp., Sweetwater, TN (US)

(72) Inventor: Adam O' Ryan, Sweetwater, TN (US)

(73) Assignee: SCHOTT GEMTRON CORP., Sweetwater, TN (US)

( * ) Notice: Subject to any disclaimer, the term of this patent is extended or adjusted under 35 U.S.C. 154(b) by 229 days.

(21) Appl. No.: 15/356,056

(22) Filed: Nov. 18, 2016

(65) Prior Publication Data

US 2017/0146709 A1 May 25, 2017

Related U.S. Application Data

(60) Provisional application No. 62/258,209, filed on Nov. 20, 2015.

(51) Int. Cl.
*G02B 5/20* (2006.01)
*C03C 17/34* (2006.01)
*G02B 5/28* (2006.01)

(52) U.S. Cl.
CPC .......... *G02B 5/208* (2013.01); *C03C 17/3417* (2013.01); *G02B 5/282* (2013.01); *C03C 2217/734* (2013.01); *C03C 2218/365* (2013.01)

(58) Field of Classification Search
None
See application file for complete search history.

(56) References Cited

U.S. PATENT DOCUMENTS

| | | | |
|---|---|---|---|
| 3,701,872 A | 10/1972 | Levinson | |
| 3,853,612 A | 12/1974 | Spanoudis | |
| 4,398,077 A | 8/1983 | Freedman | |

(Continued)

FOREIGN PATENT DOCUMENTS

| | | |
|---|---|---|
| CN | 101568206 | 10/2009 |
| CN | 201668310 | 12/2010 |

(Continued)

OTHER PUBLICATIONS

International Preliminary Report on Patentability for corresponding PCT/US17/45302 dated Aug. 28, 2018, 10 pages.

(Continued)

*Primary Examiner* — Derek S. Chapel
(74) *Attorney, Agent, or Firm* — Ohlandt, Greeley, Ruggiero & Perle, L.L.P.

(57) ABSTRACT

The present disclosure provides a coated glass or glass-ceramic substrate, wherein at least two coating layers are applied to each side of the substrate. Each of the coating layers comprises one or more metal oxides, and optionally a dopant. The dopant can be a halogen or post transition metal. The coated substrate can have two coating layers on each side, three coating layers on each side, or two coating layers on one side and three coating layers on the other side. The properties of each of the coating layers are adjusted so that the coated substrate can reflect infrared light in targeted wavelength ranges. The properties that can be adjusted include the number of coating layers, the coating layer thickness, the coating layer composition, the index of refraction of each coating layer, and the location of each coating layer according to their index of refraction.

4 Claims, 1 Drawing Sheet

(56) References Cited

U.S. PATENT DOCUMENTS

| | | | | |
|---|---|---|---|---|
| 5,240,886 | A | * | 8/1993 | Gulotta .................. C03C 3/095 501/70 |
| 5,350,927 | A | | 9/1994 | Rakhimov |
| 5,385,872 | A | * | 1/1995 | Gulotta .................. C03C 3/095 501/71 |
| 5,393,593 | A | * | 2/1995 | Gulotta .................... C03C 1/10 428/212 |
| 6,024,084 | A | * | 2/2000 | Gerhardinger ...... C03C 17/3417 126/200 |
| 6,596,398 | B1 | * | 7/2003 | Russo ................ C03C 17/2453 428/426 |
| 6,797,388 | B1 | * | 9/2004 | Szanyi ............... C03C 17/3417 427/164 |
| 6,822,208 | B2 | | 11/2004 | Henze |
| 7,556,868 | B2 | | 7/2009 | Thiel |
| 8,573,194 | B2 | | 11/2013 | Henn |
| 8,772,687 | B2 | | 7/2014 | Boxman |
| 2006/0188730 | A1 | * | 8/2006 | Varanasi ............. A47F 3/0434 428/432 |
| 2007/0077411 | A1 | | 4/2007 | Hatta |
| 2009/0197097 | A1 | * | 8/2009 | Medwick ............. B32B 17/06 428/432 |
| 2010/0155043 | A1 | | 6/2010 | Smith |
| 2014/0004323 | A1 | | 1/2014 | Bockmeyer |
| 2014/0220272 | A1 | | 8/2014 | Lee |
| 2015/0168618 | A1 | * | 6/2015 | Nakajima ................ B32B 7/02 359/359 |
| 2016/0195651 | A1 | * | 7/2016 | Yoshioka ................ B32B 7/02 359/359 |

FOREIGN PATENT DOCUMENTS

| | | |
|---|---|---|
| CN | 102153959 | 8/2011 |
| CN | 203861052 | 10/2014 |
| CN | 204141996 | 2/2015 |
| CN | 104812115 | 7/2015 |
| DE | 4422439 | 1/1996 |
| JP | H0668975 | 3/1994 |
| JP | H0948640 | 2/1997 |
| WO | 2007046085 | 4/2007 |
| WO | 2015185214 | 12/2015 |
| WO | 2016144312 | 9/2016 |
| WO | 2018027034 | 2/2018 |
| WO | 2018031019 | 2/2018 |

OTHER PUBLICATIONS

Yang, "Silicon carbide powders: Temperature-dependent dielectric properties and enhanced microwave absorption at gigahertz range", Elsevier, Solid State Communications, vol. 163, pp. 1-6.

International Search Report and Written Opinion for corresponding PCT/US17/45302 dated Oct. 20, 2017, 10 pages.

* cited by examiner

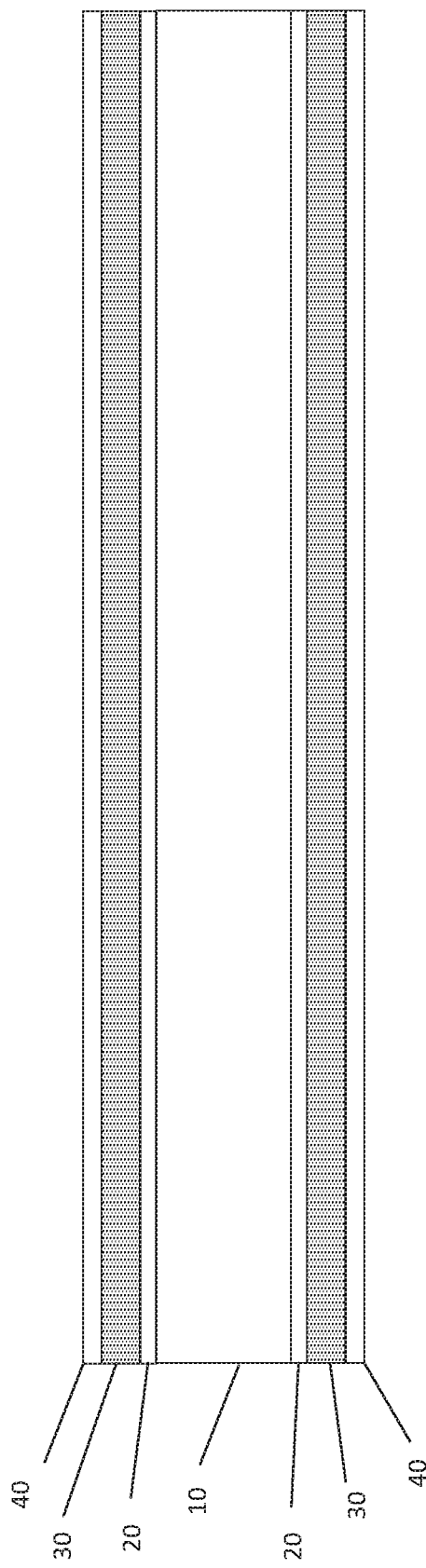

MULTI-LAYER COATED GLASS SUBSTRATE

CROSS-REFERENCE TO RELATED APPLICATIONS

The present application claims the benefit of U.S. Provisional Application Ser. No. 62/258,209, filed on Nov. 20, 2015, which is herein incorporated by reference.

BACKGROUND OF THE DISCLOSURE

1. Field of the Disclosure

The present disclosure relates to a glass substrate that is coated with multiple coating layers, in order to give the coated substrate the ability to reflect infrared wavelength in targeted ranges. More particularly, the present disclosure relates to four, five, and six-layered coatings on the glass substrate, where the coatings comprise one or more metal oxides and optional dopants.

2. Description of the Related Art

Current heat reflective coatings on glass are typically designed for 400 nm to 1200 nm or 5000 nm to 50,000 nm wavelengths, which are primarily visible light applications or long wavelength IR, lower temperature applications, respectively. For example, such coatings would be used on architectural windows to keep heat out or heat in, depending on the climate in which they were used. These coatings have limited performance when used for heat reflection in the range from 1000 nm to 5000 nm, or 5000 nm to 21,000 nm, which is the infra-red light range.

Some current multi-layered coatings are primarily used in the interior surfaces of multi-pane insulated glass windows in order to avoid exposure to an atmosphere other than an inert gas, such as argon. These coatings can't be used in heated appliance applications due to rapid coating degradation. Some reflectivity exists in the range from 700 nm to 1200 nm, but it is not optimized, as the application is for prevention of solar heat transmission through glass in hotter climates.

Existing single layer pyrolytic coatings are limited and have only one heat reflective surface. The second surface of the substrate is not coated, or if it is coated, sputtered coatings are typically applied. These coatings are typically optimized for 10,000 nm to 50,000 nm wavelengths. Some reflectivity exists in the range from 5000 nm to 10000 nm, but it is not optimized, as the application is typically for prevention if heat loss through glass in cold climates.

Existing single layer pyrolytic coatings that are produced on two sides simultaneously, or in one-pass serial production processes, are limited in that they can only be optimized for heat reflective applications by way of an increased coating thickness. However, the durability and performance of thicker coatings degrades due to a mismatch in expansion characteristics between the glass substrate and the coating. To prevent this, the overall thickness of the coating layers does not exceed 350 nm. Either way, these single layer coatings do not provide for improved reflectivity in the 1000 nm to 2500 nm range and only limited improvement in the 2500 nm to 5000 nm range.

Some existing multi-layered pyrolytic coatings also consist of a sub-layer with limited or no heat reflecting properties, and the surface layer which is heat reflecting. Overall coating thickness limitations prevent the surface layer from being fully optimized for the purpose of heat reflection in the 1000 nm to 5000 nm range.

There is a need to address these deficiencies, and for a coated glass substrate that can be customized to reflect light in the ranges of 1000 nm to 5000 nm, and from 5000 nm and 21000 nm.

SUMMARY OF THE DISCLOSURE

The present disclosure provides a coated glass substrate with a multi-layered coating. As described in greater detail below, the multilayer coatings of the present disclosure can be applied and customized to target reflection of desired wavelengths. This customization is achieved by adjusting properties, such as the number of layers, the thickness of each layer, the chemical composition of each layer, the index of refraction of each layer, and the positioning of layers according to their indices of refraction. Short, medium and long wavelength infrared reflective surfaces, applied in layers, will improve the overall reflectivity in the range from 700 nm to 21,000 nm, which would include both visible and infrared wavelengths. Changing the index of refraction of each layer affects reflection characteristics in the range from 700 nm to 1200 nm. The number of layers used can address the range from 1000 nm to 5000 nm and allows for optimization in the range of 5000 nm to 21,000 nm. The coating layers of the present disclosure are applied via pyrolytic deposition, which is not reactive with the atmosphere or chemicals, and is not affected by high temperatures. This overcomes the limitations of sputtered coatings.

In one embodiment, the present disclosure provides a multi-layer coated substrate, comprising a glass or glass-ceramic substrate and a plurality of coating layers on each side of the substrate. Each of the coating layers has a thickness, a chemical composition, and an index of refraction. At least one of the thickness, chemical composition, and index of refraction of a first of the coating layers is different than the thickness, chemical composition, and index of refraction of other coating layers, so that each of the plurality of layers exhibits reflection of infrared light.

The use of the term "glass" in the present disclosure should be understood to include glass and glass-ceramics, including but not limited to soda lime, borosilicate, and lithium aluminosilicate. The term "substrate" signifies a platform to which the coatings described herein can be applied. The substrates of the present disclosure can be flat, having a rectangular or square shape. Other shapes are contemplated. The substrate can also be curved, concave, or convex instead of flat.

BRIEF DESCRIPTION OF THE DRAWINGS

FIG. 1 shows a schematic view of a multi-layered coated glass substrate according to the present disclosure.

DETAILED DESCRIPTION OF THE DISCLOSURE

In the present disclosure, multiple coating layers of a coating comprising a metal oxide are applied to one or both sides of a glass substrate. The metal oxide can be either doped or un-doped. The properties of the coating layers can be varied so that they provide reflective properties of light in desired wavelengths. The properties of each coating layer that can be varied include, but are not limited to, the number of coating layers, the thickness of each coating layer, the chemical composition of the coating layer (e.g. the type of metal oxide, the presence of a dopant in the metal oxide, the type of dopant), the index of refraction of each coating layer, and the positioning of coating layers according to their indices of refraction. In this way, reflection of specific wavelength values or bands can be addressed individually, such that the overall coating can be optimized for various applications including very high temperature use.

Since the coating layers, which are independently applied, all have metal oxides, they share oxygen with each other and the glass substrate. This results in a shared, chemical oxygen bond between the coating layers and the glass substrate. This bonding further increases the durability of the coated glass substrate, without the concern of the properties of one coating layer being incompatible with another coating layer. Without the bonding and shared oxygen, the coating layers may be much more fragile.

The multi-layer coated substrate of the present disclosure can have two coating layers on each side of the substrate, which would be a four- or quad-layer coating. There can also be two coating layers on one side of the substrate, and three coating layers on the second side, which would be a five- or penta-layer coating. There can also be three coating layers on each side of the substrate, which would be a six- or sexta-layer coating.

FIG. 1 shows a schematic of a coated substrate 10 according to the present disclosure. In the embodiment shown in FIG. 1, a first coating layer 20, a second coating layer 30, and a third coating layer 40 are applied to each side of substrate 10. As described above, the present disclosure contemplates that there can be only two coating layers on each side of substrate 10, or two coating layers on one side and three on the other side.

The metal oxides used in the coating layers of the present disclosure can be selected from the group consisting of tin (Sn), titanium (Ti, including all oxidation states of titanium), silicon (Si), zinc (Zn), hafnium (Hf), cadmium (Cd), cerium (Cr), niobium (Nb), and zirconium (Zr), and any combinations thereof. Each coating layer may also contain a mixture of two or more of the listed oxides (e.g., silicon and titanium oxides within the same coating layer).

The coating layers can use metal oxides in their pure, undoped form, or the metal oxides may also include dopants. Suitable dopants include halogens and post transition metals, combinations of one or more halogens, combinations of one or more post transition metals, or combinations or one or more halogens and one or more transition metals. The amount of dopant in the metal oxides of the coating layers can be two percent or less by weight. In one example, the coating layer is made of a fluorine-doped tin oxide, which is represented by the formula $SnO_2$:F.

As previously discussed, manipulating the thickness of each coating layer can also affect the wavelengths of light that are reflected. The overall thickness of the coating layers combined, per side of the glass substrate, should be five hundred nanometers or less, and preferably three-hundred fifty nanometers or less. The total combined thickness of the coating layers on both sides of the glass substrate is thus one thousand nanometers or less, preferable seven hundred nanometers or less. In another embodiment, the combined thickness of coating layers on each side of the glass substrate is one hundred twenty nanometers or less.

Individual coating layers can have varying thickness, from as small as twenty nanometers, up to two hundred nanometers, or any subranges therebetween. Other coating layers can have a thickness of from fifty nanometers to one hundred twenty nanometers, from ninety nanometers to one hundred twenty nanometers, or from one hundred fifty to two hundred nanometers, or any subranges therebetween.

The following are examples of specific embodiments of the coated substrate of the present disclosure. In a first embodiment, a four-layer coated substrate comprises a first coating layer comprising $SnO_2$:F, doped to produce a specific index of refraction targeted to reflect a specific wavelength. The thickness of the first coating layer is between 90 nanometers (nm) and 120 nm. The second coating layer comprises $SnO_2$:F, un-doped or doped to a different unique refractive index than the first layer, in a thickness range from 150 nm to 200 nm. These two coating layers are applied to each side of the glass substrate. As used herein, a "first" coating layer is the coating layer applied immediately to the glass substrate, and the "second" coating layer is applied over the first coating layer.

In a second embodiment, a six-layer coated substrate comprises a first coating layer comprising $SnO_2$, $SiO_2$ or $TiO_2$ (i.e., undoped), in a thickness range from 20 nm to 50 nm. Second and third coating layers would be similar to the first and second coating layers of the first embodiment described above, respectively. The combined thickness of the three coating layers is 350 nm or less. The "third" coating layer is applied on top of the second coating layer. Each of these three coating layers is applied to each side of the substrate.

In a third embodiment, a variant of the six-layer coated substrate comprises a first coating layer comprising $SnO_2$:F, doped or un-doped, in a thickness range from 90 nm to 150 nm. A second coating layer comprises $SnO_2$, $SiO_2$ or $TiO_2$ (undoped), in a thickness range from 20 nm to 50 nm. The third coating layer comprises $SnO_2$:F, un-doped or doped to a different unique refractive index, in a thickness range from 150 nm to 200 nm. The combined thickness of all three coating layers is 400 nm, preferably 350 nm or less. The three coating layers are applied to each side of the substrate.

In a fourth embodiment, a second variant of the six-layer coated substrate comprises a first coating layer comprising $SnO_2$:F, doped or un-doped, in a thickness range from 90 nm to 150 nm. A second coating layer comprises $SnO_2$:F, un-doped or doped to a different unique refractive index, in a thickness range from 150 nm to 200 nm. A third coating layer comprises $SnO_2$, $SiO_2$, $TiO_2$, or a combination thereof, in a thickness range from 20 nm to 50 nm. The combined thickness of all three coating layers is less than 400 nm, preferably 350 nm or less. The three coating layers are applied to each side of the substrate.

In a fifth embodiment which is a species of the second embodiment described above, a six-layer coated substrate comprises a first coating layer comprising $TiO_2$, at a thickness of 20 nm, a second coating layer comprising $SnO_2$ at a thickness of 100 nm, and a third coating layer of $SnO_2$:F at a thickness of 200 nm. The three coating layers are applied to each side of the substrate. This fifth embodiment provides targeted reflectivity in the light range from 800 nm to 2000 nm. The first two coating layers have a higher index of refraction than the third, with the index of refraction of the first coating layer being the highest. The three coating layers are applied to each side of the substrate.

The arrangement of coating layers in the fifth embodiment, as well as some of the other embodiments, may provide for color muting. Some heat reflective coatings also reflect visible light in different wavelengths. Depending on coating thickness and uniformity, yellow, red, green and blue colors can be seen. Changes in indices of refraction between layers will tend to reduce reflection back in the direction of the incoming light and instead reflect light at larger angles, or at the critical angle for some wavelengths. The typical multi-layer coating will have a dull green and a dull red appearance because of this phenomenon. The coated glass substrate of the present disclosure can be designed to reduce or eliminate this color reflection. This is what is meant by "color muting".

In a sixth embodiment, a first coating layer comprises $TiO_2$ at a thickness of 20 nm, a second coating layer comprises $SnO_2$:F at a thickness of 80 nm, and a third coating layer comprises $SnO_2$:F at a thickness of 220 nm. The second and third coating layers have a different percent of fluorine (F), which results in a different refractive index. This provides for reflectivity in the range from 800 nm to 2000 nm and an improvement in reflectivity in the range from 2000 nm to 4000 nm. A further improvement is provided for in the range from 4000 nm to 10,000 nm. The three coating layers are applied to each side of the substrate.

In a seventh embodiment, with is a five-layer coated substrate, on one side of the substrate, a first coating layer comprises $SnO_2$:F at a thickness of 130 nm, a second coating layer comprises $SnO_2$ at a thickness of 80 nm, and a third coating layer comprises $SnO_2$:F at a thickness of 180 nm. On a second side of the substrate, a first coating layer comprises $SnO_2$ at a thickness of 80 nm, and a second coating layer comprises $SnO_2$:F at a thickness of 180 nm. This arrangement provides improved reflectivity in the range from 2000 nm to 21,000 nm, and the index change between coating layers provides an almost neutral color or tinted look.

In each of the first through seventh embodiments described above, the coating layer thickness values can be within +/−10% of the recited values, or within +/−5% of the recited values.

The coating layers of the present disclosure can be applied via chemical vapor deposition (CVD), or other processes such as dip- or roll on-coating.

While the present disclosure has been described with reference to one or more particular embodiments, it will be understood by those skilled in the art that various changes may be made and equivalents can be substituted for elements thereof without departing from the scope thereof. In addition, many modifications can be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

The invention claimed is:

1. A multi-layer coated substrate, comprising:
   a glass substrate; and
   on each side of the glass substrate, a first coating layer comprising $SnO_2$:F, having a thickness between 90 nm and 120 nm, and a second coating layer comprising $SnO_2$:F, having a thickness between 150 nm and 200 nm,
   wherein the first coating layer has a different index of refraction than the second coating layer.

2. The coated substrate of claim 1, further comprising a third coating layer comprising a metal oxide selected from the group consisting of $SnO_2$, $SiO_2$ and $TiO_2$.

3. The coated substrate of claim 1, wherein the first coating layer and the second coating layer are applied by pyrolytic deposition.

4. The coated substrate of claim 1, consisting of the glass substrate, the first coating layer and the second coating layer.

* * * * *